United States Patent [19]

Stiles

[11] 4,168,194
[45] Sep. 18, 1979

[54] METHOD FOR PRODUCTION OF FIBER REINFORCED RESIN STRUCTURES

[75] Inventor: Kenneth M. Stiles, San Dimas, Calif.

[73] Assignee: Sea Log Corporation, Pasadena, Calif.

[21] Appl. No.: 854,411

[22] Filed: Nov. 23, 1977

Related U.S. Application Data

[63] Continuation-in-part of Ser. No. 824,039, Aug. 12, 1977, abandoned, which is a continuation-in-part of Ser. No. 744,029, Dec. 22, 1976, abandoned.

[51] Int. Cl.² ............................................. B32B 17/00
[52] U.S. Cl. ................................... 156/166; 156/180; 156/245; 156/272; 156/311; 156/322; 156/441; 264/137; 264/263; 264/294
[58] Field of Search .............. 156/180, 441, 324, 311, 156/322, 499, 372, 245; 264/137, 258, 294, 327, 261, 263; 427/434 R, 434 D, 434 E, 374 R, 374 A, 398 R, 430

[56] References Cited

U.S. PATENT DOCUMENTS

| | | | |
|---|---|---|---|
| 2,684,318 | 7/1954 | Meek | 156/180 |
| 2,871,911 | 2/1959 | Goldsworthy et al. | 156/180 |
| 2,948,649 | 8/1960 | Pancherz | 156/180 |
| 2,977,630 | 4/1961 | Bazler | 156/180 |
| 3,125,483 | 3/1964 | Ganahl | 156/432 |
| 3,629,028 | 12/1971 | McLarty | 156/175 |
| 3,718,449 | 2/1973 | Fahey | 65/3 C |

FOREIGN PATENT DOCUMENTS

236629  11/1964  Australia ................................. 156/180

OTHER PUBLICATIONS

Plastics Design and Processing, 1976, pp. 8-9.

*Primary Examiner*—Michael W. Ball
*Attorney, Agent, or Firm*—Christie, Parker & Hale

[57] ABSTRACT

A resin reinforced fiber structure is formed by drawing fibers under tension, in spaced relation to each other through a bath containing a molten heat curable resin, combining the fibers in mutual contact for removal of excess resin, spreading the fibers for passage through a preheating zone and then in a recombined state through a plurality of radiant heating zones and relatively narrow cold shaping dies in series. The preheating and heating zones provide heated surfaces in spaced relation to the resin coated fibers, effect a viscosity break to enable the resin to more completely wet the fibers and advance polymerization towards a gel point. The narrow cold shaping dies provide the desired shape to the final article and remove excess resin as cure is advanced. The fiber reinforced resin structure at about the resin gel point is passed through a final cold shaping die, and then to a final curing zone.

12 Claims, 3 Drawing Figures

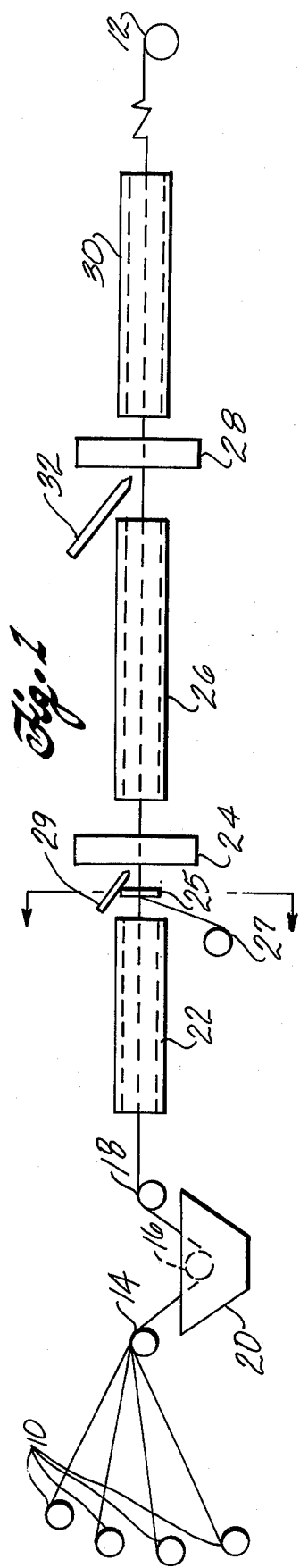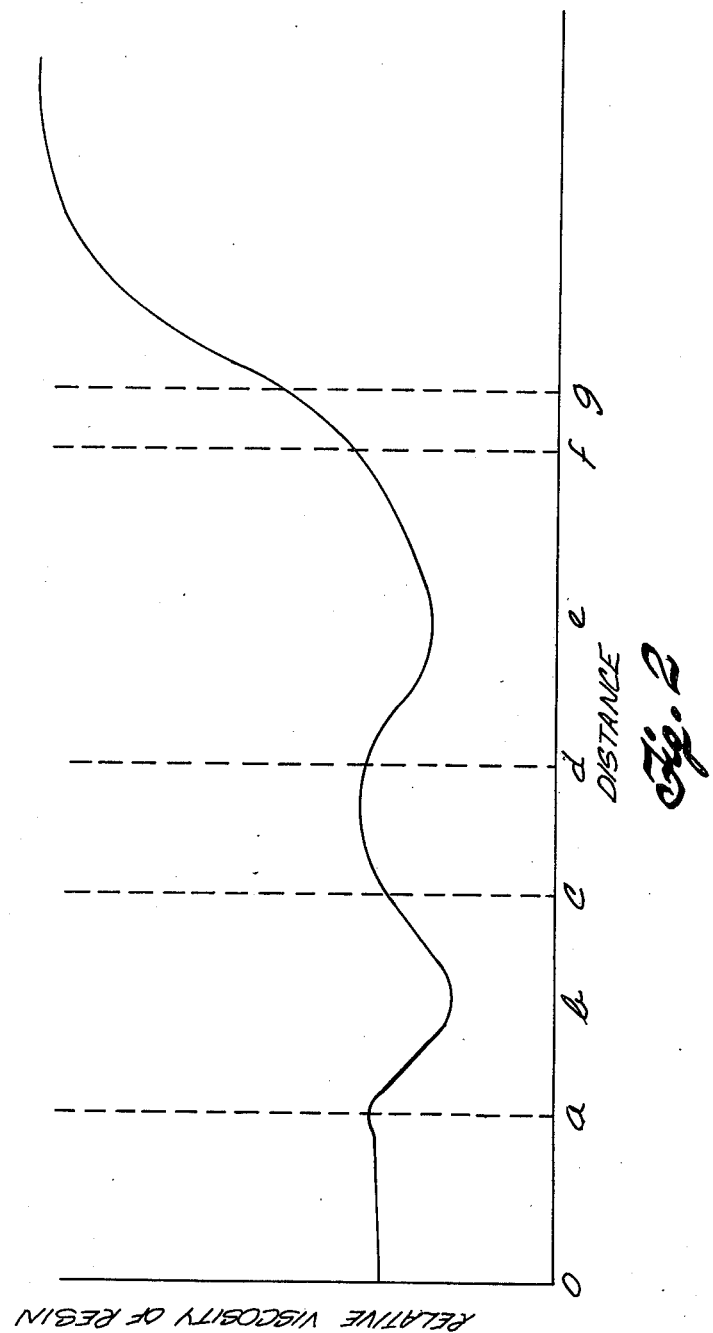

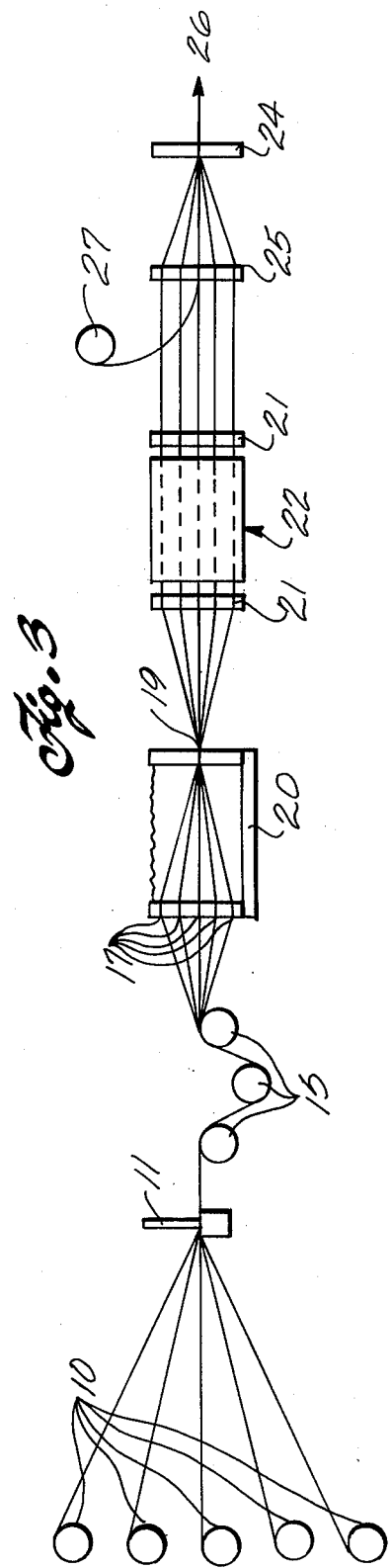

METHOD FOR PRODUCTION OF FIBER REINFORCED RESIN STRUCTURES

CROSS REFERENCE TO RELATED APPLICATION

This application is a continuation-in-part of my application Ser. No. 824,039 filed Aug. 12, 1977, now abandoned, which is a continuation-in-part of application Ser. No. 744,029 filed Dec. 22, 1976 now abandoned.

BACKGROUND OF THE INVENTION

The present invention is directed to improvements in a process for the production of fiber reinforced resin structures, known as pultrusion.

Pultrusion is a technique in which resin-coated fibers are pulled through an elongated heated tube which induces shape to the structure and cross-linkings of the resin. Typically, the fibrous material is fed through a liquid resin bath where individual fibers are thoroughly coated with the resin. Excess material is stripped from the reinforcement by brushes or rollers. The saturated resin reinforced fibers enter an elongated heated die and post curing in an oven immediately following the die have been employed. In the process, the elongated die is relied on as the primary source of heat to effect cure and provides heat to the resin by conduction.

Pultrusion and its general applications are described in "Plastics Design and Processing", May 1976 (pp. 8 and 9), and in U.S. Pat. No. 2,871,911 to Goldsworthy et al, incorporated herein by reference. A modification of the process is described in U.S. Pat. No. 2,948,649 to Pancherz incorporated herein by reference.

Essential to the production of high strength fiber reinforced resin structures is a condition that all the fibrous elements be completely wetted by the resin, that the fibrous elements do not break, and that an absolute minimum of binding resin remain in the finished structure to minimize the distance between adjacent fibers. The pultrusion process, as it has been practiced, has not been found to fully achieve these ends and has been overly costly in the energy required to achieve drawing of a fiber reinforced resin structure into a desired configuration. In addition, the use of elongated dies can result in a disfigurement of the surface of the article due to localized accumulation of cured resin within the interior of the die.

SUMMARY OF THE INVENTION

In accordance with the present invention, there is provided an improved process for forming fiber reinforced resin structures by a technique which involves drawing resin impregnated fibers through a die under tension.

The process of the present invention comprises, under tension, first coating a plurality of continuous fibers spaced in relation to each other with a molten, heat curable thermosetting resin composition, the resin being sufficiently liquid to at least partially coat the fibers but maintained at a temperature below that at which cure of the resin will be initiated. The coated fibers are combined in contiguous relation and passed through an excess resin removal zone then spread apart and passed through a preheating zone in spaced relation. There the spaced fibers are heated by at least one radiant heating surface spaced from the fibers to achieve a reduction of resin viscosity then combined and passed through a first shaping die. Any fiber or fibers to be clad by the resin coated fibers is added ahead of or at the first shaping die. The precoated recombined fibers are then passed through a plurality of elongated radiant heating zones in series, each providing at least one heated surface, the surfaces of the heating zones being spaced from the resin impregnated fibers, the radiant heating zones of the series being separated from each other by at least one cold shaping die, each die being narrow relative to the length of the radiant heating zones. In each radiant heating zone, the resin is heated, by radiation and convection, to a temperature sufficient to induce some polymerization and still reduce the viscosity of the resin, preferably, to below its initially applied viscosity. This makes the resin more mobile to increase wetting of the fiber surfaces as an aid in shaping to the final structure. Resin temperature achieved in each heating zone is sufficient to induce partial cure of the resin which induces a viscosity sufficient to prevent the resin from draining from the fiber surfaces.

As indicated, between each radiant heating zone, the fiber and coating resin are drawn through one or more relatively narrow cold shaping dies. The shaping dies are maintained at a temperature substantially below the temperature at which curing of the resin is initiated. In passing through the orifice of each die, the resin and fibers are progressively formed into the desired cross-sectional configuration with attendant expulsion of excess resin. This maximizes radial compression of the fibers in respect to each other. The dies should be maintained at a temperature sufficiently low such that cure of the expelled resin within the die or on the die surface will not be promoted. This permits expelled resin to flow over the due surface. If the resin which is expelled tends to collect on the surface of the die, it can be removed by raising die temperature and/or by an air blast or the like.

Gel point, the point at which viscosity can no longer be reduced by application of heat and where cure will be accelerated with a large release of heat per unit mass, is delayed until at or just before the last die. At this point, the resin is in a firm gel state where the structure retains its configuration but remains workable to a degree to enable any excess resin to flow and be removed from the surface by a final shaping die. Final cure is reserved, if it is used, to a curing zone following the last die.

Following each die of the series, except for the last, the resin is heated to achieve a reduction in viscosity and to further promote cure towards the gel point with an attendant increase in viscosity after passing through a viscosity minimum during passage through each heat zone. In passing through the final heat zone of the series, the resin-coated fiber may reach the gel point.

Beyond the final die, there may be and preferably is positioned a radiant heated curing zone where, through the application of heat, cure from the gell point to the fixed resin state is achieved such that the applied resin will become totally cured and set to enable collection of the structure as a product. Elimination of the radiant heating curing zone only extends the distance of travel of the product to a windup roll so that cure will be complete before the windup roll is reached.

In the practice of this invention, each die is to be maintained at as low a temperature as conveniently possible to act as a shaping die while tending to retard cure during the shaping process. The die may be partially heated by provided heating means or allowed to be heated simply to whatever temperature is induced in the passage of heated parallel fiber-resin matrix therethrough and heat of radiation and/or convection from the adjacent heating zones. It is essential that the die surface be maintained at a temperature sufficiently high such that the resin which exudes from the fiber-resin matrix passing through the die onto the surface of the die will flow from and be removed from the surface before thickening or cure occurs. This prevents the formation of cured resin at the die orifice which would otherwise increase friction, disfigure the surface of the article being shaped and, perhaps, induce rupture of the fibers passing through the die.

Rate of passage through the dies and heating zones is normally controlled by the number of heating zones and dies in series, the minimum number of heating zones and dies respectively employed being two. As the number of heating zones and dies are increased, the rate of feed through the system can be increased materially with the proviso that attainment of the gel point is precluded until contact with or just prior to contact with the final die. In general, the point relative to the final die at which the resin reaches the gel point becomes less critical as the number of dies increase.

By passing the coated fibers after contact in spaced relation to each other through the preheating zone, there is achieved a more uniform coating of the fibers which in end minimizes the amount of resin required to achieve a uniform high strength product.

DESCRIPTION OF THE DRAWINGS

FIG. 1 is a schematic illustration of apparatus used and the steps which occur in practice of the process of this invention;

FIG. 2 illustrates the relative viscosity of the applied resin at each stage along the process; and FIG. 3 illustrates the presently prepared steps of processing the fibers to the first shaping die.

DETAILED DESCRIPTION OF THE INVENTION

With reference to FIGS. 1 and 3, the fibers to be formed into a fiber reinforced resin structure or for embracing another fiber in strengthening or protective (ruggedizing) relationship are provided by plurality of creels or spools 10 and are drawn under tension provided by take-up reel 12 and passed, if desired, through comb 11 to remove splinters and the like. They may as shown in FIG. 1 be passed over roller 14 and under 16 to achieve an initial resin coat. In this instance, the coated fibers may be passed over roller 18 which acts as squeegee to remove excess resin. Other means of removing excess resin may also be used. The presently preferred route is detailed in FIG. 3.

With reference to FIG. 3, the fibers from comb 11 are passed over tensioning rolls 15 and spread in a fan-like array by orifices 17 in the inlet and wall of resin bath 20. The orifices are fitted with seals to prevent resin leakage. The fibers are coated with resin in spaced relation to one another and combined at sizing orifice 19, also provided with a seal to prevent leakage, then spread apart by spacing dies 21 and maintained in spaced relation through preheating chamber 22. Orifice 19, in addition to bringing the fibers into contiguous contact, acts as a means to remove excess coated resin serving for this purpose the equivalent of squeegee roll 18 of FIG. 1.

The resin supplied is a heat curable thermosetting resin composition maintained in a liquid state at ambient or elevated temperatures.

The nature of the thermosetting resin may be varied widely and include, among others, epoxy resins, such as epoxidized cyclopentadiene; polyesters, phenolformaldehyde resins; ureaformaldehyde resins; diallyl phthalate resins; silicone resins; phenol-furfural resins; urethane resins and the like, depending upon the desired composition of the finished product. Included in the melt is a high temperature initiator or hardener which is latent in respect to initiation of cure while in the molten bath but at some elevated temperature will initiate and propagate cure of the resin to a thermoset end product. Typical of such hardeners are aromatic amines. Included as desired are accelerators, diluent resins, fillers, colorents, flame retardants, and the like. The temperature of bath 20 is not narrowly critical so long as it is maintained at a temperature below the temperature at which cure of the resin will be initiated. This is known as the resin "A" stage. Generally, a typical bath temperature will range from about 20° to about 30° C. Agitation and pressure-vacuum recycling of the bath may be used to occlude the presence of air bubbles or the like as is required.

As fibers are drawn through the bath and over roller 18 or through orifice 19, they are precoated with the thermosetting resin melt and carried to and passed under tension through a first radiant heating chamber 22 in spaced relation to each other. Orifice 19 serves in the preferred embodiment to combine the fibers just ahead of chamber 22 while the first spacing die 21 spreads them apart for passage through preheat chamber 20. This has been found to provide a more uniform coating on the fibers and in the end results in a product of more uniform axial strength with a minimum of resin necessary to achieve the desired strength. With reference to FIG. 2, in radiant heating chamber 22, which serves as a preheat chamber, the resin is heated from radiant energy received from a heated surface(s) always in spaced relation to the surface of the resin coated fibers which are spaced from each other and by convection to initiate polymerization and break resin viscosity. This induces an initial reduction in viscosity (a-b) such that the resin will become more fluid and more throughly and uniformly wet the fibers. Cure initiates with an attendant increase in viscosity (b-c) to return to about the initial viscosity. This is to prevent the resin from draining from the fiber surfaces before or at shaping die 24. Typical internal preheat zone temperatures are from about 85° to about 130° C., depending on the initiation temperature required by the accelerator to start cure. The cure initiates and begins the "B" stage at about the minimum point (b) of the viscosity curve illustrated in FIG. 2. With initiation of cure, viscosity increases as some of the cross-linking reactions occur.

The resin and fibers are then brought into contact with and passes through the orifice a first cold shaping die 24 where an initial shape is provided to the fiber reinforced resin matrix with exclusion of a portion of the resin. The resin is forced from the matrix as it passes through the die and normally runs over the die surface. To facilitate its expulsion from the die orifice, a blast of a fluid, such as air, may be induced from jet 29. This prevents the resin from curing or congealing on the surface of the die.

Ahead of the first cold shaping die, there may be positioned one or more guide grids 25 used to position the fibers in proper spacial relation to one another for entry to die 24 and for adding, if desired, a fiber from reel 27 to be surrounded by the other fibers. The fibers passing through the preheating zone are as shown in FIG. 3 in a spaced parallel or converging fan-like configuration and formed into a circular pattern by grid 25 with a central opening for introduction of a fiber from reel 27 for passage, in combination, through a circular shaped die orifice. Little, if any, resin is lost in passing the resin coated fibers through grid 25.

By "cold shaping" or "relatively cold shaping" die 24, there is meant a die which is relatively narrow in respect to the length of the radiant heating zones and maintained at a temperature below the temperature of adjacent heating zones and below the temperature at which cure of the resin will be promoted and which serves to suppress the curing process to the extent the expelled resin will flow over the die surface and away from the die orifices. To this end, the die may be allowed to achieve whatever surface temperature results as an incidence to the passage of the heated fibers and resin through the die, and from radiation and convection from adjacent radiant heating zones to promote flow of expelled resin over its surface. It may, if desired, be internally heated to promote flow of the expelled resin over its surface as required to prevent resin from congealing on the die, particularly at the die orifice. Effective die temperatures up to about 70° C. have been employed.

After passing through cold shaping die 24 where the resin may have reached a relatively constant viscosity and with reference again to FIG. 2, the composition is passed through a second radiant heating zone 26 having a heated surface spaced from the resin and fiber where through an increase in temperature induced by radiation and convection, the viscosity of the resin is again reduced (d-e) and cure promoted (e-f). After passing through the minimum (e) as shown in FIG. 2, viscosity increases.

The sequence is repeated as often as desired and, in practice, as many as five or more dies in series have been used until a final cold die 28 treated in the same manner as die 24 is reached.

The process is controlled such that the structure reaches the gel point (g) at or just prior to final shaping die 28.

The "gel point" is where the resin is in a glassy solid state, still sufficiently soft to mold and remove excess resin to thereby enable the formation of the final shape to the article, but is otherwise beyond the point where a viscosity reduction with heating will occur. It is also the point where cure will be irreversibly accelerated. Such as is shown in FIG. 2, viscosity will on a relative basis rapidly increase with time with a high exotherm per unit mass.

Following passage through final cold shaping die 28, the shaped product is normally passed through a final radiant curing zone 30 where, through the application of heat by radiation and convection, cure is accelerated and the resin sufficiently cured to enable the final product to be drawn by a take-up reel 12.

In the practice of the process, the heating zones following the first cold shaping die are typically maintained at a higher temperature than the first preheating zone and in the instance of high temperature cured epoxy resins in a range of about 170° to about 220° C. or at least at a temperature sufficient for the resin to break its viscosity to enhance wetting of fibers and filling interstices between the fibers. The post curing zone 30 is maintained at the same, lower or higher temperature as one of the preceding zones. The curing zone may be operated in the same temperature range.

Typically, resin content at the exit of the first die of the series is normally at a level from about 20 to about 40% resin based on the weight of resin and fibers and will be reduced by about 20 to 25% by weight of the original resin content by the time the final die is reached. The precise amounts will vary depending on the desired degree of compaction between fibers.

The heating zones may be of any desired cross-sectional shape and of a shape independent of the cross section of the article to be produced. Heating may be by resistance coils, heating tapes, fluid flow and the like with suitable thermostatic control. Heating of the resin and fibers is by radiation and convection. Conduction is not employed since there is no contact between the resin and fibers with the internal surfaces of the radiant heating and curing zones.

Each of the radiant heating and curing zones used in the practice of the process of this invention are in spaced relation to the resin and fibers which pass through them. Their function, except for the curing zone, is to cause viscosity reduction of the resin while polymerization is stepwise progressed to the gel point, but play no part in shaping of the final structure. This function is reserved to the relatively narrow cold shaping dies. While the radiant heating zones may range from 2 feet or less to 8 feet or more in length, the shaping dies will have a thickness of from about 1/64 to ¼ inch, depending on the rigidity necessary to accommodate the load imposed by the passage of resin and fibers through the orifices of the dies. Orifice openings may be from 0.01 inch or less to 0.5 inch or more. The die orifices are normally provided with rounded inlet edge surfaces to reduce friction and promote removal of exuded resin.

As a consequence of employing narrow shaping dies which cooperate with adjacent radiant heating zones which play no shaping function, the energy required to achieve a finished product as compared to the techniques taught, for instance, in U.S. Pat. No. 2,948,649 is materially reduced. In addition, the continuous removal of the exuded resin over the surface of the die either by flow alone and/or with an air blast, there is avoided buildup of resin at the orifice. This avoids surface defigurement which can readily occur in an elongated heating or cooling shaping section as described in such patent. Surface irregularities within elongated shape controlling sections, for instance, can entrain resin which become stagnant and tends to cure leaving rough spot(s) to increase friction and cause defigurement of the article to be shaped.

The process of this invention may be used with any of the known fiberous materials including metallic, semimetallic, natural organic, synthetic fibers, glass fibers, and combinations thereof. Illustrative fibers are glass fibers, steel fibers, Aramid TM fibers, graphite fibers, and the like. Included within the fibers may be fibers which are to be surrounded by other protective coatings include soft metal fibers, such as copper, optical fibers, and the like.

The process of this invention is applicable to forming configurations of any desired cross section. They may be formed as relatively thin planar structures containing electrical conductors, optical fibers, fluid conductors, and the like contained within a surrounding fiber reinforced resin structure, the shape of which is determined by the cold shaping dies. Multiple coating of individual fibers may also be employed with precoating of fibers accomplished in tandem operations or two or more coating units operated as desired to meet the ends of the end product required. For instance, in the situation where a central fiber is surrounded by strengthening fibers, the central fiber may be coated with a release material to which the resin will not adhere or bond to provide a fiber which, in substance, is surrounded by a fiber reinforced cured resin casing which can be stripped from the central fiber without breaking adhesive bonds between the resin and the central fiber.

By the practice of the instant invention, more precise control over the shape and quality of the end product is achieved at a material reduction in power consumption. In addition, fibers can be drawn through the shaping apparatus without breaking and can be compacted to the maximum extent possible.

While nowise limiting, the following examples illustrate the practice of the process of this invention.

EXAMPLE 1

There was maintained a molten heat curable resin bath comprised of 100 parts by weight Epoxy Resin 826 manufactured and sold by Shell Chemical Company, 26 parts by weight of an hardener known as Jeffamine 230 manufactured and sold by Jefferson Chemical Company, and 6 parts by weight of an accelerator, Accelerator-398 manufactured and sold by Jefferson Chemical Company. Bath temperature was maintained at 15.6° C. To reinforce coat an enameled copper wire, strands of a glass fiber known as S-901 manufactured and sold by Owens Corning Corporation were drawn through the bath at a rate of 12 feet per minute. The resin coated glass fibers were then passed through a first radiant preheating chamber maintained at 93° C. to achieve a first viscosity reduction of the resin. The length of the preheating chamber was 8 feet. The wire was centrally introduced to the glass fiber-resin matrix and with the surrounding glass fibers and resin was drawn through a first die at a temperature of 65° C., and then through a second radiant heating zone of 6 feet in length maintained at 175° C. to achieve a second viscosity reduction in the binding resin. The heated preformed cable was then drawn through a second die again at a temperature of 65° C. as induced by the drawn matrix. The resin had reached the gel point at the second die. After passage through the second cold shaping die, the gelled resin impregnated glass fiber reinforced wire was passed through a post curing chamber maintained at 175° C. Chamber length was 12 feet. Following cure, the product was wound onto a reel.

EXAMPLE 2

There was coated, using the resin system of Example 1, 28 ends of Owens Corning S-901, each containing about 201 glass filaments and passed through the resin bath at the rate of 12 feet per minute. After the initial coating, the resin and fibers are passed over a squeegee roll to the extent of providing fibers containing from about 25 to 30% by weight resin based on the weight of resin and fibers. The resin impregnated fibers were then passed through a first radiant preheating zone maintained at a temperature of about 110° C. The preheating zone as all subsequent heating zones, was constructed of a "U" shaped channel 4" wide across the base and having 2" high sides. Heat was provided by thermostatically controlled heating tapes along the length of the channel and covered by an aluminum plate. The zone is closed at the top by a removable aluminum lid. The radiant preheating zone was 8 feet long.

After emerging the preheating zone, an optical fiber of 5.0 mil diameter buffered to a thickness of 20 mils with a room temperature cured silicone rubber by the method as described in my U.S. application Ser. No. 600,202 filed July 30, 1975, and incorporated herein by reference, was added using two guide grids in series. The guide grids centered the buffered optical fiber which became surrounded by the resin coated fibers. The combination was drawn through a first cold shaping die having an orifice of 0.048 inch in diameter and the first of five additional radiant heating zone having the same construction as the preheating zone, but of a length of about 30 inches. The cold shaping die after the first of the radiant heating zones had an orifice of 0.044 inch in diameter and the orifice openings of the remaining dies was 0.04 inch. Spacing between heating zones was about 6" between which the die was positioned. Radiation and convection adjacent heating zones maintain die surfaces at about 66° C. Internal heating zone temperature of each of the five radiant heating zones was about 171° C. The resin reached a gel point just prior to the last die. In the process, about 20% by weight of the resin is removed from the structure leaving a final structure containing from about 22 to about 25% by weight resin based on the weight of resin and fibers. THe structure was passed to a curing zone of the sectional configuration and structure as described above and maintained at 177° C. The length of the curing zone was 28 feet. Using the operation glass fiber ruggedized buffer optical fibers up to 10,000 feet in length were produced.

EXAMPLE 3

The procedure of Example 2 was repeated to produce structures of 0.5 inch is outside diameter. Solid structures as well as containing embedded metal and buffered optical fibers were produced. For a structure of 0.5 inch outside diameter feed rate was reduced to 6 feet per minute, the radiant preheating zone was maintained at about 110° C., the intermediate radiant heating zones at 204° C. and the curing zone at 177° C.

As will be appreciated by those skilled in the art, any functional die between radiant heating zones may consist of a plurality of dies in series, and any radiant heating zone between two dies may consist of a plurality of radiant heating zones in series.

EXAMPLE 4

There was maintained, at a temperature of 21° to 24° C., a molten bath of a heat curable epoxy resin formulation comprised of 100 parts by weight Epoxy Resin 826, 32 parts by weight of Tonox Hardener manufactured and sold by Naugasett Chemical Company, and 4 parts by weight of D.M.P. No. 30 Accelerator manufactured and sold by Rohm and Haas Chemical Company. To reinforce (ruggedize) a buffered, graded index, optical fiber of Type SCVD supplied by International Telephone and Telegraph Company, 28 ends (Owens Corning S-901, high glass filaments) were drawn through the resin bath in spaced relation at a speed of 10 feet per minute, and on leaving the resin bath, where combined and passed through an aperture to remove excess resin. The fibers were then separated by a spacing die having apertures with a spacing of one-quarter inch between adjacent strands, and in this open configuration the parallel strands were carried through an 8-foot long preheating zone in spaced relation to the internal surfaces of the preheating zone maintained at 127° C.

At the outer end of the preheating zone, the optical fiber was introduced into the center of the group of reinforcing resin coated glass fibers, and the combined fibers were drawn together and through five successive sizing dies and heating chambers with the combined fibers in spaced relation to the surfaces of the chambers. Each of the heating chambers was 32 inches in length and was maintained at a temperature of 182° C. At the end of this process, the cured and finished, ruggedized optical fiber was wound on 4-foot diameter reel driven by a speed controlled pullthrough drive motor.

What is claimed is:

1. A process for the production of fiber reinforced resin structures which comprises, under tension:
   (a) coating a plurality of continuous fibers in spaced relation to each other with a liquid heat curable thermosetting resin composition at a resin temperature below the temperature at which cure of the thermosetting resin is initiated;
   (b) converging the coated fibers to a common point to achieve contiguous contact of fibers while removing excess of the liquid heat curable thermosetting resin from the fibers;
   (c) spreading the resin coated fibers from the common point to achieve spaced relation between the resin coated fibers;
   (d) passing the resin coated fibers in spaced relation to each other through at least one elongated radiant preheating zone having at least one heated internal surface, the internal surfaces of the preheating zone being in spaced relation to the spaced resin coated fibers, said preheating zone raising the applied resin by radiation and convection to a temperature sufficient to reduce the viscosity of the resin relative to the introduction viscosity of the resin to the radiant preheating zone and initiate cure of the resin;
   (e) converging and passing the heated resin coated fibers through a structure shaping orifice of at least one first cold shaping die position between said radiant preheating zone and a next radiant heating zone, said cold shaping die being at a die temperature substantially below the temperature at which curing of the resin is initiated;
   (f) passing the resin coated fibers from the first cold shaping die through a plurality of elongated radiant heating zones, each having at least one heated internal surface, each heating zone being spaced from each other and from at least one interposed cold shaping die which is relatively narrow with respect to the length of a radiant heat zone and having a structure shaping orifice, the internal surfaces of each heating zone being in spaced relation to the resin coated fibers, said radiant heating zones raising the applied resin by radiation and convection to a temperature above the temperature of the radiant preheating zone and sufficient to reduce the viscosity of the resin relative to the introduction viscosity of the resin to a radiant heating zone and initiate further cure of the resin;
   (g) drawing the fibers and resin through the orifices of each cold shaping die between each radiant heating zone at a die temperature substantially below the temperature at which curing of the resin is initiated;
   (h) drawing the resin coated fibers through at least one final cold shaping die following the last of said radiant heating zones, said die being at a temperature substantially below the temperature at which cure of the resin is initiated, the resin being at the gel point at or prior to contact with said final die.

2. A process as claimed in claim 1 in which the resin of the heat curable thermosetting resin is an epoxy resin.

3. A process as claimed in claim 1 in which the liquid heat curable thermosetting resin is at a temperature from about 20° to about 30° C.

4. A process as claimed in claim 1 in which each radiant preheating zone is at a temperature from about 85° to about 130° C. and each additional said radiant heating zone is at a temperature of from about 170° C. to about 220° C.

5. A process as claimed in claim 1 in which the resin coated fibers exiting the final die are passed through a radiant heated curing zone having at least one internal heated surface, the internal surfaces of the curing zone being spaced from the resin coated fibers, said resin coated fibers remaining in said radiant curing zone for a time sufficient to substantially cure the resin to a thermoset state.

6. A process as claimed in claim 5 in which the radiant heated curing zone is maintained at a temperature from about 170° C. to about 220° C.

7. A process for the production of fiber reinforced resin structures which comprises, under tension:
   (a) coating a plurality of continuous fibers in spaced relation to each other with a liquid heat curable thermosetting resin composition at a resin temperature below the temperature at which cure of the thermosetting resin is initiated;
   (b) converging the coated fibers to a common point to achieve contiguous contact of fibers while removing excess of the liquid heat curable thermosetting resin from the fibers;
   (c) spreading the resin coated fibers from the common point to achieve spaced relation between the resin coated fibers;
   (d) passing the resin coated fibers in spaced relation to each other through at least one elongated radiant preheating zone, having at least one heated internal surface, the internal surfaces of the preheating zone being in spaced relation to the spaced resin coated fibers, said heating zone raising the applied resin by radiation and convection to a temperature sufficient to reduce the viscosity of the resin relative to the introduction viscosity of the resin to the radiant preheating zone and initiate cure of the resin;
   (e) combining an inner continuous elongate structure with the heated resin coated fibers in a predetermined position of the elongate structure relative to the resin coated fibers and, converging the resin coated fibers about the elongate structure;
   (f) passing the heated resin coated fibers and added elongate structure through a structure shaping orifice of at least one first cold shaping die position between said radiant preheating zone and a next radiant heating zone, said cold shaping die being at a die temperature substantially below the temperature at which curing of the resin is initiated;
   (g) passing the resin coated fibers and added elongate structure from the first cold shaping die through a plurality of elongated radiant heating zones, each having at least one heated internal surface, each heating zone being spaced from each other and from at least one interposed cold shaping die between each heating zone which is relatively narrow with respect to the length of a radiant heat zone and having a structure shaping orifice, the internal surfaces of each heating zone being in spaced relation to the resin coated fibers, said radiant heating zones raising the applied resin by radiation and convection to a temperature above the temperature of the radiant preheating zone and sufficient to reduce the viscosity of the resin relative to the inroduction viscosity of the resin to the radiant heating zone and initiate further cure of the resin;

(h) drawing the fibers, resin and added elongate structure through the orifices of each cold shaping die between each heating zone at a die temperature substantially below the temperature at which curing of the resin is initiated; and, (i) drawing the resin coated fibers and added elongate structure through at least one final cold shaping die following the last of said heating zones, said die being at a temperature substantially below the temperature at which cure of the resin is initiated, the resin being at the gel point at or prior to contact with said final die.

8. A process as claimed in claim 7 in which the resin of the heat curable thermosetting resin is an epoxy resin.

9. A process as claimed in claim 7 in which the liquid heat curable thermosetting resin is at a temperature from about 20° to about 30° C.

10. A process as claimed in claim 7 in which each radiant preheating zone is at a temperature from about 85° to about 130° C. and each additional said radiant heating zone is at a temperature of from about 170° C. to about 220° C.

11. A process as claimed in claim 7 in which the resin coated fibers exiting the final die are passed through a radiant heated curing zone having at least one internal heated surface, the internal surfaces of the curing zone being spaced from the resin coated fibers, said resin coated fibers remaining in said radiant curing zone for a time sufficient to substantially cure the resin to a thermoset state.

12. A process as claimed in claim 11 in which the heated curing zone is maintained at a temperature from about 170° C. to about 220° C.

* * * * *